(12) United States Patent
Hashimoto (10) Patent No.: US 8,682,544 B2
(45) Date of Patent: Mar. 25, 2014

(54) VEHICLE AND CONTROL METHOD THEREOF

(75) Inventor: Toshiya Hashimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 59 days.

(21) Appl. No.: 13/505,710

(22) PCT Filed: Dec. 11, 2009

(86) PCT No.: PCT/JP2009/070733
§ 371 (c)(1),
(2), (4) Date: May 2, 2012

(87) PCT Pub. No.: WO2011/070673
PCT Pub. Date: Jun. 16, 2011

(65) Prior Publication Data
US 2012/0215392 A1     Aug. 23, 2012

(51) Int. Cl.
*B60L 11/00* (2006.01)
*G06F 7/00* (2006.01)
*B60K 6/20* (2007.10)

(52) U.S. Cl.
USPC ............. 701/51; 701/22; 903/930; 180/65.21

(58) Field of Classification Search
CPC ...................................... B60L 11/00
USPC ............ 701/22, 51, 58, 67; 180/65.21, 65.31, 180/65.6, 65.265; 903/902, 945, 930; 477/34, 39, 70
See application file for complete search history.

(56) References Cited

U.S. PATENT DOCUMENTS

| 7,217,221 B2 * | 5/2007 | Sah et al. ........................... 477/3 |
| 8,052,570 B2 | 11/2011 | Kumazaki et al. |
| 2003/0004031 A1 * | 1/2003 | Philips et al. ...................... 477/5 |
| 2005/0255968 A1 * | 11/2005 | Sah et al. ...................... 477/200 |
| 2013/0124027 A1 * | 5/2013 | Tanishima et al. .............. 701/22 |

FOREIGN PATENT DOCUMENTS

| JP | 06038305 A | 2/1994 |
| JP | 08126115 A | 5/1996 |
| JP | 2008-168813 A | 7/2008 |
| JP | 2009-067270 A | 4/2009 |

* cited by examiner

*Primary Examiner* — Yonel Beaulieu
(74) *Attorney, Agent, or Firm* — Gifford, Krass, Sprinkle, Anderson & Citkowski, P.C.

(57) ABSTRACT

In the case that operation stop of the engine is requested while the clutch is engaged and the engine is driven at a higher rotation speed than the resonance rotation speed band, the clutch is disengaged and the engine is driven in the self-sustaining operation at the self-sustaining rotation speed higher than the resonance rotation speed band, the rotation speed Ne of the engine is lowered less than or equal to the second rotation speed Nref2 lower than the resonance rotation speed band with stop of fuel injection into the engine and the partially-engaged clutch after the rotation speed Nm of the motor MG becomes less than or equal to the first rotation speed Nref1 predetermined as a rotation speed lower than the resonance rotation speed after the clutch is disengaged. The rotation speed of the engine is therefore enabled to pass more rapidly through the resonance rotation speed band.

5 Claims, 5 Drawing Sheets

VEHICLE AND CONTROL METHOD THEREOF

TECHNICAL FIELD

The present invention relates to a vehicle and a control method of a vehicle.

BACKGROUND ART

One proposed vehicle having an engine, a clutch placed between an output shaft of the engine and a transfer shaft linked to driving wheels, and a motor connected to the transfer shaft, is driven using output power from the engine with the clutch engaged or driven using only output power from the motor with the clutch disengaged (see, for example, Patent Document 1). This vehicle is driven with the clutch disengaged in the case the vehicle speed becomes low or the case the vehicle load becomes small.

PRIOR ART DOCUMENT

Patent Document

Patent Document 1: Japanese Patent Laid-Open No. H06-38305

SUMMARY OF THE INVENTION

In the case that operation stop of the engine is requested while the vehicle is driven with the clutch engaged in the above vehicle, a relatively long time may be required to lower the rotation speed of the engine passing through a resonance rotation speed band if the clutch is disengaged and fuel injection into the engine is stopped, and may give uncomfortable feeling to the driver and passenger due to noise or vibration of the vehicle caused by the resonance of the vehicle.

In the vehicle and the control method of the vehicle of the invention, the main object of the invention is to have the internal combustion engine rapidly pass through the resonance rotation speed band when stopping operation of the internal combustion engine.

In order to attain the main object, the vehicle and the control method of the vehicle of the invention have the configurations discussed below.

According to one aspect, the present invention is directed to a vehicle. The vehicle has: an internal combustion engine configured to output power via a clutch to a driveshaft linked to driving wheels; a motor configured to input and output power from and to the driveshaft; an accumulator configured to transmit electric power to and from the motor; and a controller configured to, in a case of a predetermined stop request time that is when operation stop of the internal combustion engine is requested while the internal combustion engine is in operation with the clutch engaged at a higher rotation speed than a resonance rotation speed band that is a rotation speed range of the internal combustion engine where resonance occurs in the vehicle, control the internal combustion engine, the motor, and the clutch so that the clutch is disengaged and the vehicle is driven with a driving force demand required for driving the vehicle while keeping a rotation speed higher than the resonance rotation speed band in the internal combustion engine, and subsequently control the internal combustion engine, the motor, and the clutch so that the rotation speed of the internal combustion engine is lowered below the rotation speed band by partially engaging the clutch and stopping fuel injection into the internal combustion engine and the vehicle is driven with the driving force demand after a rotation speed of the motor reaches less than or equal to a predetermined rotation speed as a rotation speed lower than the resonance rotation speed band.

In the vehicle according to this aspect of the invention, in a case of a predetermined stop request time that is when operation stop of the internal combustion engine is requested while the internal combustion engine is in operation with the clutch engaged at a higher rotation speed than a resonance rotation speed band that is a rotation speed range of the internal combustion engine where resonance occurs in the vehicle, the internal combustion engine, the motor, and the clutch are controlled so that the clutch is disengaged and the vehicle is driven with a driving force demand required for driving the vehicle while keeping a rotation speed higher than the resonance rotation speed band in the internal combustion engine, and subsequently the internal combustion engine, the motor, and the clutch are controlled so that the rotation speed of the internal combustion engine is lowered below the rotation speed band by partially engaging the clutch and stopping fuel injection into the internal combustion engine and the vehicle is driven with the driving force demand after a rotation speed of the motor reaches less than or equal to a predetermined rotation speed as a rotation speed lower than the resonance rotation speed band. In the case of the predetermined stop request time, the rotation speed of the internal combustion engine is lowered below the resonance rotation speed band by partially engaging the clutch and stopping fuel injection into the internal combustion engine in the state that the rotation speed of the motor is lower than the resonance rotation speed band. Accordingly, this effectively enables the rotation speed of the internal combustion engine to pass more rapidly through the resonance rotation speed band, in comparison with the case that the rotation speed of the internal combustion engine is lowered by disengaging the clutch and stopping fuel injection into the internal combustion engine. Here the terminology 'clutch' includes a conventional clutch for interconnecting two rotation systems, as well as a brake for fixing one rotation system to a non-rotation system, such as casing.

In one preferable application of the vehicle of the invention, the vehicle may further have: a transmission that has an input shaft connected via the clutch to an output shaft of the internal combustion engine and connected with a rotating shaft of the motor and transmits power between the input shaft and the driveshaft with a speed change between different speeds, and the controller may control the transmission, in a case that the rotation speed of the motor becomes less than or equal to the predetermined rotation speed if the speed in the transmission is changed to a higher speed level that is a higher speed than a present speed in the transmission in the case of the predetermined stop request time, so that the speed in the transmission is changed to the higher speed level after the clutch is disengaged. This arrangement effectively enables the rotation speed of the motor less than or equal to the predetermined rotation speed in the case of the predetermined stop request time.

In one preferable application of the vehicle having the transmission of the invention, the controller may control the transmission, in a case that the rotation speed of the motor does not become less than or equal to the predetermined rotation speed even if the speed in the transmission is changed in the case of the predetermined stop request time, so that the speed in the transmission is changed to a highest speed level of the transmission after the clutch is disengaged. This arrangement effectively enhances the possibility of having the rotation speed of the motor less than or equal to the predetermined rotation speed in the case of the predetermined stop request time.

In another preferable application of the vehicle having the transmission of the invention, the vehicle may further have: a braking force applying unit configured to apply braking force to the vehicle, and the controller may control the motor and the braking force applying unit, in a case that the driving force demand as a braking force is not satisfied with a nominal torque output from the motor according to the rotation speed of the motor if the speed in the transmission is changed to the higher speed level on condition that the rotation speed of the motor becomes less than or equal to the predetermined rotation speed if the speed in the transmission is changed to the higher speed level in the case of the predetermined stop request time, so that the vehicle is driven with the driving force demand satisfied with the nominal torque output from the motor and the braking force applied from the braking force applying unit to the vehicle. This arrangement effectively enables more certainly the vehicle driven with the driving force demand as braking force when the speed in the transmission is changed to the higher speed level in the predetermined stop request time.

In still another preferable application of the vehicle of the invention, the controller may perform control regarding when operation stop of the internal combustion engine is requested upon accelerator-off as the predetermined stop request time.

In another preferable application of the vehicle of the invention, the controller may control the clutch so that the partially engaged clutch is disengaged in a case that the rotation speed of the internal combustion engine becomes less than or equal to a second predetermined rotation speed as a rotation speed lower than the resonance rotation speed band.

According to another aspect, the present invention is directed to a control method of a vehicle. The vehicle has: an internal combustion engine configured to output power via a clutch to a driveshaft linked to driving wheels; a motor configured to input and output power from and to the driveshaft; and an accumulator configured to transmit electric power to and from the motor. In a case of a predetermined stop request time that is when operation stop of the internal combustion engine is requested while the internal combustion engine is in operation with the clutch engaged at a higher rotation speed than a resonance rotation speed band that is a rotation speed range of the internal combustion engine where resonance occurs in the vehicle, the control method controls the internal combustion engine, the motor, and the clutch so that the clutch is disengaged and the vehicle is driven with a driving force demand required for driving the vehicle while keeping a rotation speed higher than the resonance rotation speed band in the internal combustion engine, and subsequently controls the internal combustion engine, the motor, and the clutch so that the rotation speed of the internal combustion engine is lowered below the rotation speed band by partially engaging the clutch and stopping fuel injection into the internal combustion engine and the vehicle is driven with the driving force demand after a rotation speed of the motor reaches less than or equal to a predetermined rotation speed as a rotation speed lower than the resonance rotation speed band.

In the control method of the vehicle according to this aspect of the invention, in a case of a predetermined stop request time that is when operation stop of the internal combustion engine is requested while the internal combustion engine is in operation with the clutch engaged at a higher rotation speed than a resonance rotation speed band that is a rotation speed range of the internal combustion engine where resonance occurs in the vehicle, the internal combustion engine, the motor, and the clutch are controlled so that the clutch is disengaged and the vehicle is driven with a driving force demand required for driving the vehicle while keeping a rotation speed higher than the resonance rotation speed band in the internal combustion engine, and subsequently the internal combustion engine, the motor, and the clutch are controlled so that the rotation speed of the internal combustion engine is lowered below the rotation speed band by partially engaging the clutch and stopping fuel injection into the internal combustion engine and the vehicle is driven with the driving force demand after a rotation speed of the motor reaches less than or equal to a predetermined rotation speed as a rotation speed lower than the resonance rotation speed band. In the case of the predetermined stop request time, the rotation speed of the internal combustion engine is lowered below the resonance rotation speed band by partially engaging the clutch and stopping fuel injection into the internal combustion engine in the state that the rotation speed of the motor is lower than the resonance rotation speed band. Accordingly, this effectively enables the rotation speed of the internal combustion engine to pass more rapidly through the resonance rotation speed band, in comparison with the case that the rotation speed of the internal combustion engine is lowered by disengaging the clutch and stopping fuel injection into the internal combustion engine. Here the terminology 'clutch' includes a conventional clutch for interconnecting two rotation systems, as well as a brake for fixing one rotation system to a non-rotation system, such as casing.

MODES FOR CARRYING OUT THE INVENTION

One mode of carrying out the invention is discussed below as a preferred embodiment.

Figure 1:
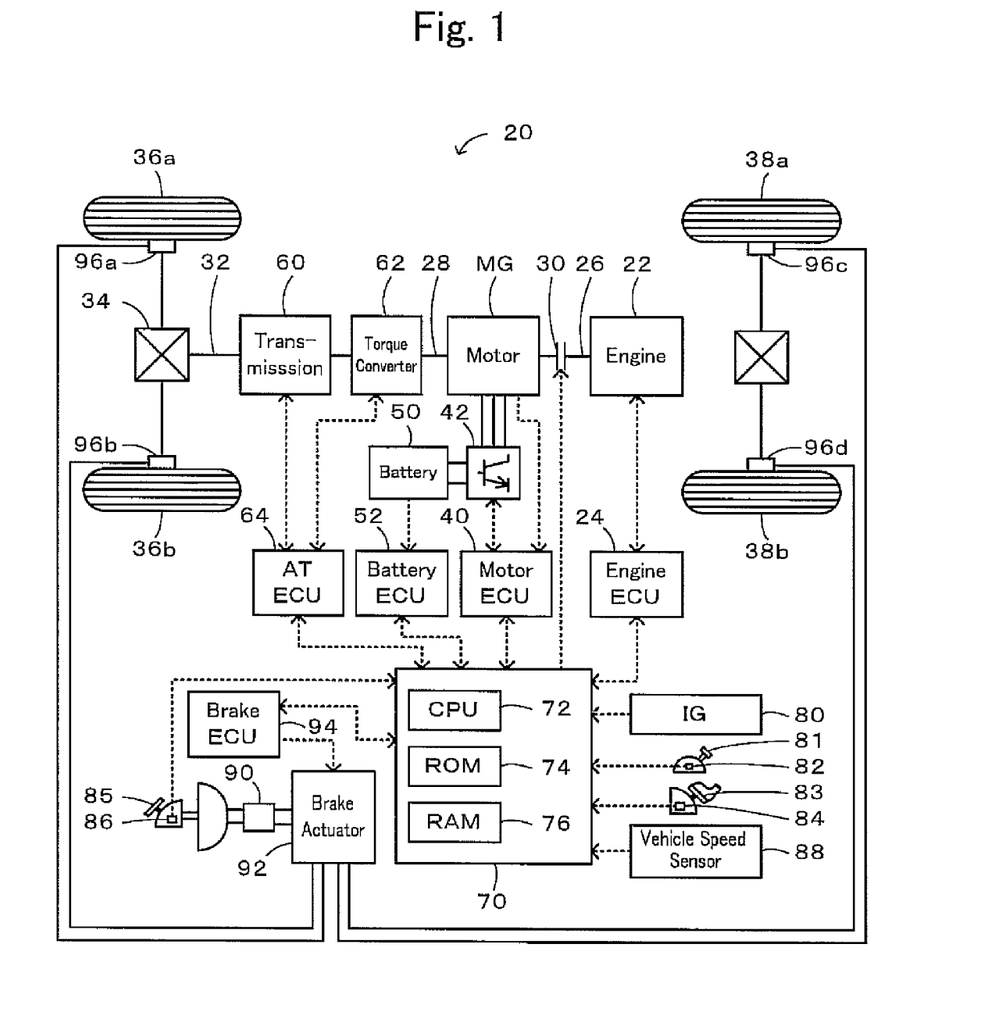
FIG. 1 schematically illustrates the configuration of a hybrid vehicle 20 in one embodiment of the invention.

FIG. 1 schematically illustrates the configuration of a hybrid vehicle 20 in one embodiment of the invention. As illustrated, the hybrid vehicle 20 of the embodiment includes the engine 22, a clutch 30 connected via a non-illustrated damper to a crankshaft 26 or an output shaft of the engine 22 and connected to a power shaft 28, a motor MG connected to the power shaft 28 and designed to have power generation capability, a battery 50 configured to transmit electric power via an inverter 42 to and from the motor MG, a transmission 60 structured to output power to a driveshaft 32 with a speed change in the power output from the engine 22 and the motor MG to the power shaft 28, an brake actuator 92 configured to control brakes of drive wheels 36a and 36b and driven wheels 38a and 38b, and a hybrid electronic control unit 70 configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit (hereafter referred to as engine ECU) 24 that inputs diverse signals from various sensors used to measure and detect the operating conditions of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements. The engine ECU 24 also computes a rotation speed of the crankshaft 26, which is equivalent to a rotation speed Ne of the engine 22, based on the crank position from a crank positions sensor (not shown) attached to the crankshaft 26.

The motor MG is a known synchronous motor generator that is driven as a generator and as a motor. Operations of the motor MG is controlled by a motor electronic control unit (hereafter referred to as motor ECU) 40. The motor ECU 40 receives diverse signals required for controlling the operations of the motor MG, for example, signals from a rotational position detection sensor (not shown) that detects the rotational position of rotor in the motor MG and phase currents applied to the motor MG and measured by current sensors (not shown). The motor ECU 40 outputs switching control signals to the inverter 42. The motor ECU 40 communicates with the hybrid electronic control unit 70 to control operations of the motor MG in response to control signals transmitted from the hybrid electronic control unit 70 while outputting data relating to the operating conditions of the motor MG to the hybrid electronic control unit 70 according to the requirements. The motor ECU 40 also performs arithmetic operations to compute rotation speed Nm of the motor MG from the output signals of the rotational position detection sensor.

The battery 50 is a secondary battery such as a nickel metal hydride battery or a lithium ion battery and under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to a power line connected with the output terminal of the battery 50, and a battery temperature Tb measured by a temperature sensor (not shown) attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. An accumulated charge ratio SOC of the battery 50 as a ratio of an accumulated charge amount in the battery 50 to the total capacity (storage capacity) of the battery 50 is calculated from an integrated value of the charge-discharge current Ib measured by the current sensor. An input limit Win as an allowable charging electric power to be charged in the battery 50 and an output limit Wout as an allowable discharging electric power to be discharged from the battery 50 are set corresponding to the calculated accumulated charge ratio SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the accumulated charge ratio SOC of the battery 50, and multiplies the base values of the input limit Win and the output limit Wout by the specified input limit correction factor and output limit correction factor to determine the input limit Win and the output limit Wout of the battery 50.

The transmission 60 has an input shaft connected to the power shaft 28 which the powers from the engine 22 and the motor MG is output to, an output shaft connected to the driveshaft 32 linked via a differential gear 34 to the drive wheels 36a and 36b, and brakes and clutches (not shown). The transmission 60 is structured to enable to connect and disconnect the power shaft 28 to and from the driveshaft 32 and to transmit input power from the power shaft 28 to the driveshaft 32 with the rotation speed change between four different speeds. The transmission 60 is controlled together with a torque converter 62 by an automatic transmission electronic control unit (hereafter referred to as ATECU) 64. The ATECU 64 controls operation of a lockup clutch (not shown) in the torque converter 64 and change the speed in the transmission 60. The ATECU 60 communicates with the hybrid electronic control unit 70 to control operations of the transmission 60 and the torque converter 62 in response to control signals transmitted from the hybrid electronic control unit 70 while outputting data relating to the operating conditions of the transmission 60 and the torque converter 64 to the hybrid electronic control unit 70 according to the requirements.

The brake actuator 92 regulates the hydraulic pressures of brake wheel cylinders 96a to 96d to enable application of a brake torque to the drive wheels 36a and 36b and to driven wheels 38a and 38b, which satisfies a brake share of a total required braking force for the hybrid vehicle 20 determined according to the pressure of a brake master cylinder 90 in response to the driver's depression of a brake pedal 85 and the rotation speed Nm of the motor MG, while regulating the hydraulic pressures of the brake wheel cylinders 96a through 96d to enable application of the brake torque to the drive wheels 36a and 36b and to the driven wheels 38a and 38b, independently of the driver's depression of the brake pedal 85. The brake ECU 94 establishes communication with the hybrid electronic control unit 70 to drive and control the brake actuator 92 in response to control signals from the hybrid electronic control unit 70 and to output data regarding the operating conditions of the brake actuator 92 to the hybrid electronic control unit 70 according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs various signals via the output port, such as drive signals to a non-illustrated hydraulic type actuator of the clutch 30. The hybrid electronic control unit 70 communicates with the engine ECU 24, the motor ECU 40, the battery ECU 52, ATECU 64, and the brake ECU 94 via the communication port to transmit diverse control signals and data to and from the engine ECU 24, the motor ECU 40, the battery ECU 52, ATECU 64, and the brake ECU 94 as mentioned previously.

The hybrid vehicle 20 of the embodiment thus constructed calculates a torque demand to be output to the driveshaft 32 based on observed values of a vehicle speed V and an accelerator opening Acc, which corresponds to a driver's step-on amount of an accelerator pedal 83. The engine 22 and the motor MG are subjected to operation control to output a required level of power corresponding to the calculated torque demand to the driveshaft 32. The operation control of the engine 22 and the motor MG selectively effectuates one of an engine drive mode and a motor drive mode. The engine drive mode engages the clutch 30 to connect the crankshaft 26 and the power shaft 28 and controls the operations of the engine 22 to output a quantity of power equivalent to the sum of the required level of power and a quantity of electric power consumed by charging the battery 50 or supplied by discharging the battery 50, while driving and controlling the motor MG to cause all or part of the power output from the engine 22 equivalent to the required level of power to be subjected to torque conversion by means of the motor MG and output via the transmission 60 to the driveshaft 32, simultaneously with charge or discharge of the battery 50. The motor drive mode disengages the clutch 30 to disconnect the crankshaft 26 and the power shaft 28, stops the operations of the engine 22 and drives and controls the motor MG to output a quantity of power equivalent to the required level of power to the driveshaft 32. The engine drive mode is changed to the motor drive mode on condition that the required level of power corresponding to the torque demand becomes less than a stopping threshold value (for example, the lower limit value in the power area that the engine 22 is operated with relatively high efficiency). The motor drive mode is changed to the engine drive mode on condition that the required level of power corresponding to the torque demand becomes more than or equal to a starting threshold value that is a little larger than the stopping threshold value.

Figure 2:
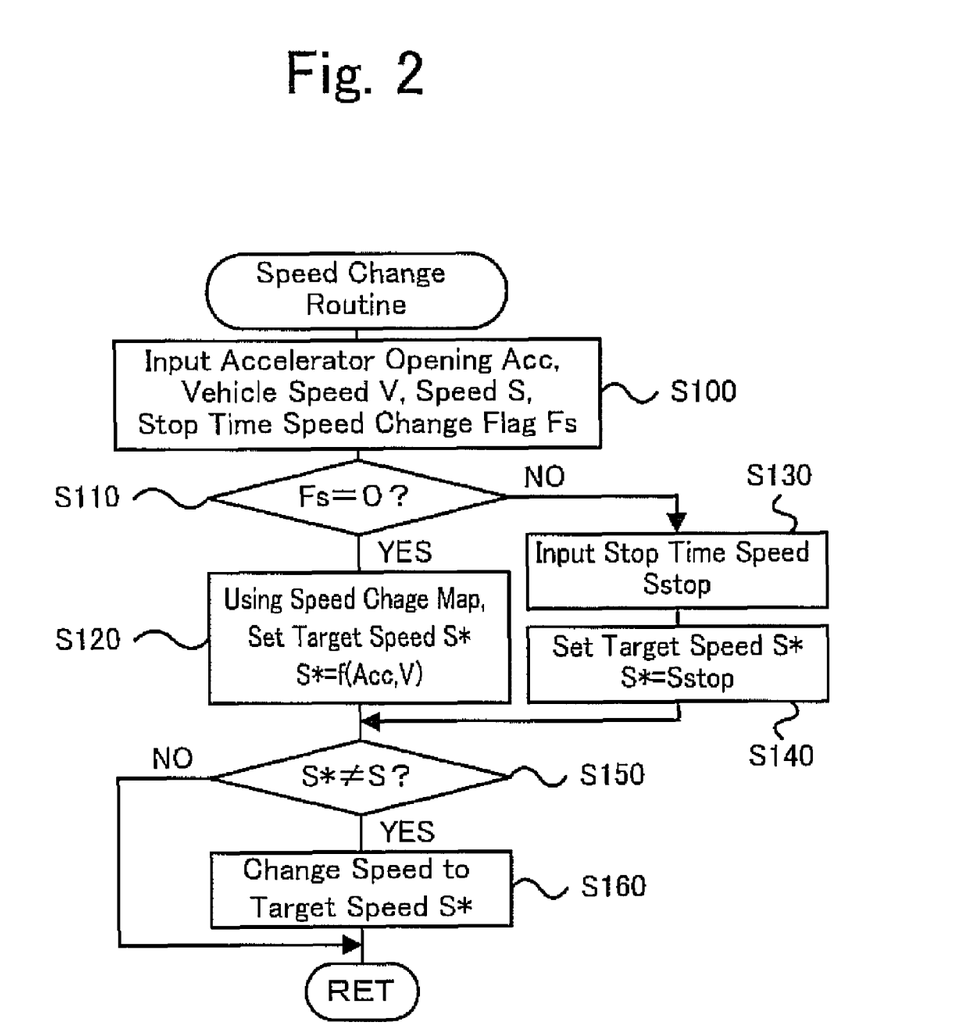
FIG. 2 is a flowchart showing a speed change control routine executed by an ATECU 64 in the embodiment.
Figure 3:
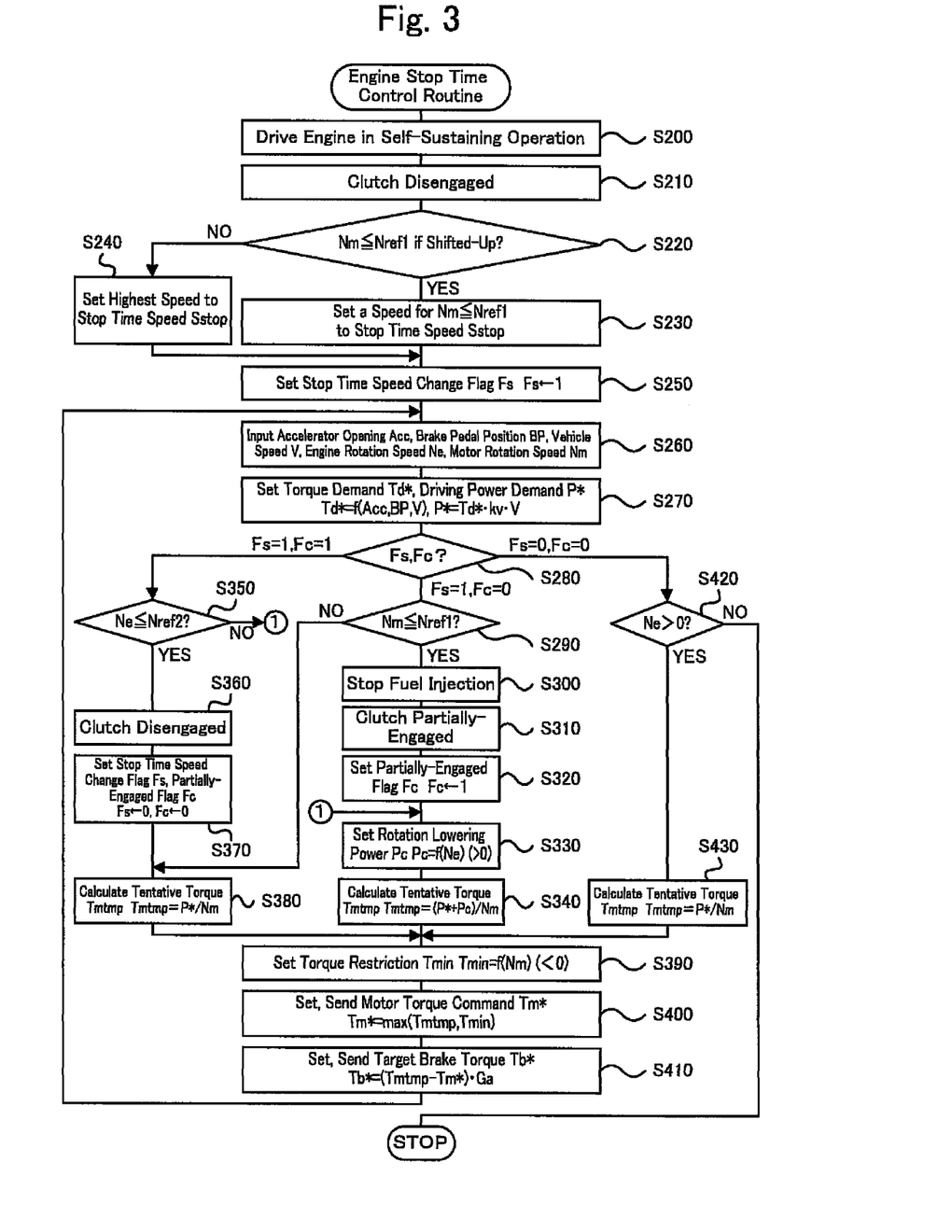
FIG. 3 is a flowchart showing an engine stop time control routine executed by a hybrid electronic control unit 70 in the embodiment.

The description regards the operations of the hybrid vehicle 20, especially the operations to stop the engine 22, of the embodiment having the configuration discussed above. FIG. 2 is a flowchart showing a speed change control routine executed by an ATECU 64, and FIG. 3 is a flowchart showing an engine stop time control routine executed by a hybrid electronic control unit 70. The routine of FIG. 2 is performed repeatedly at preset time intervals (for example, at every several msec). The routine of FIG. 3 is performed in the case that the required level of power (driving power demand P* discussed later) corresponding to the torque demand becomes less than the stopping threshold value as a result of accelerator-off and possibly further brake-on, regarding the case as a given request to stop operations of the engine 22, while the engine 22 is driven in the engine drive mode at a higher rotation speed than a resonance rotation speed band (for example, 400 rpm through 500 rpm) that is a rotation speed range of the engine 22 where resonance occurs in the hybrid vehicle 20.

In the speed change control routine of FIG. 2, a non-illustrated CPU of the ATECU 64 inputs various data required for control, for example, the accelerator opening Acc from the accelerator pedal position sensor 84, the vehicle speed V from the vehicle speed sensor 88, the present speed S in the transmission 60, a stop time speed change flag Fs representing whether the speed in the transmission 60 is required to keep a preset speed (the stop time speed Sstop discussed later) or not when stopping the operations of the engine 22 (step S100), and determines whether the input stop time speed change flag Fs is value 0 or not (step S110). The stop time speed change flag Fs is a flag set to value 0 as an initial value and set to value 1 or value 0 in the engine stop time control routine of FIG. 3 when stopping the operations of the engine 22, and is input from the hybrid electronic control unit 70 by communication.

Figure 4:
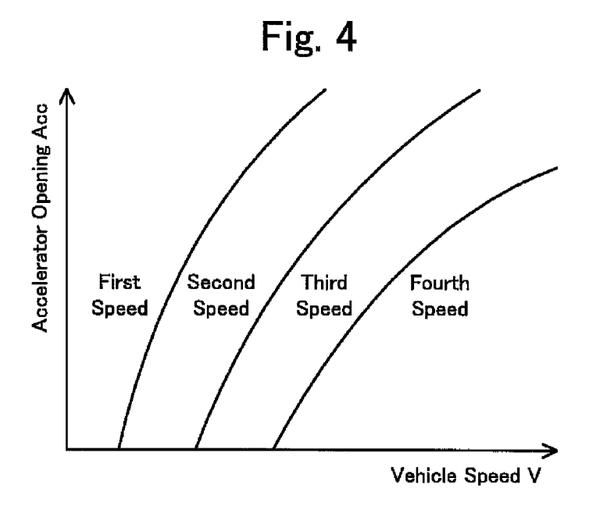
FIG. 4 shows one example of a speed change map.
Figure 5:
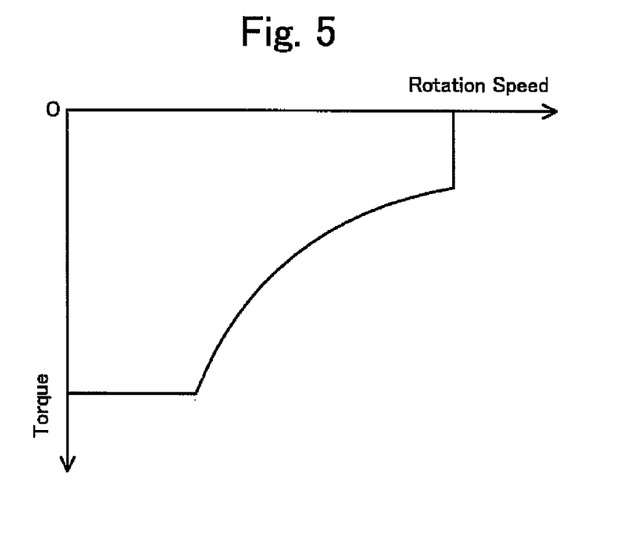
FIG. 5 shows one example of a relation between the rotation speed and nominal torque of a motor MG.

When the stop time speed change flag Fs is value 0, it is determined that ordinal speed change control which is not control for stopping the operations of the engine 22 is to be performed and the ATECU 64 sets a target speed S* based on the input accelerator opening Acc and the vehicle speed V using a speed change map of FIG. 4 (step S120). One example of the speed change map is shown in FIG. 4. The ATECU 64 compares the set target speed S* with the input speed S in the transmission 60 (step S150). When the target speed S* is the same as the speed S, it is determined that the speed in the transmission 60 is not required to be changed and terminates the speed change control routine. When the target speed S* is different from the speed S, it is determined that the speed in the transmission 60 is changed to the target speed S* (step S160) and terminates the speed change control routine. The speed change in the transmission 60 is performed by driving the non-illustrated hydraulic actuator and regulating the hydraulic pressures to be applied to clutches and brakes in the transmission 60. In the embodiment, the speed change map of FIG. 4 is predetermined for example by experiment so as to output a torque within the range of the nominal torque from the motor MG in the case that the motor MG outputs the obtained torque from dividing the driving power demand P* by the rotation speed Nm of the motor MG to output the torque demand Td* based on the accelerator opening Acc or the brake pedal position BP and the vehicle speed V to the driveshaft 32 in the motor drive mode with the disengaged clutch 30. One example of the relation between the rotation speed and nominal torque (one example to show negative side torque) of the motor MG is shown in FIG. 5. As illustrated in the figure, the size of the nominal torque of the motor MG is apparent to be fixed to a preset value in the low rotation speed area.

When the stop time speed change flag Fs is value 1, it is determined that control for keeping the speed as the control for stopping the operations of the engine 22 is to be performed and the ATECU 64 inputs the stop time speed Sstop set in the engine stop time control routine of FIG. 3 from the hybrid electronic control unit 70 by communication (step S130), and sets the input stop time speed Sstop to the target speed S*(step S140). The ATECU 64 changes the speed in the transmission 60 to the target speed S* according to the result of comparison between the set target speed S* and the present speed S (step S150 and S160) and terminates the speed change control routine. This control, in the case that the stop time change speed flag Fs is value 1, changes the speed in the transmission 60 according to the requirements without using the speed change map and keeps the stop time speed Sstop in the transmission 60. The above description is for the speed change control.

The next description is for the engine stop time control. In the engine stop time control routine of FIG. 3, the CPU 72 of the hybrid electronic control unit 70 sends the control signals to perform the self-sustaining operation in the engine 22 at a preset self-sustaining rotation speed (for example, 600 rpm or 700 rpm) higher than the resonance rotation speed band (step S200), and disengages the clutch 30 (step S210). In response to reception of the control signals, the engine ECU performs required controls including intake air flow regulation, fuel injection control, ignition control of the engine 22 to perform the self-sustaining operation in the engine 22 at the predetermined self-sustaining rotation speed.

The CPU 72 next determines whether the rotation speed Nm of the motor MG becomes less or equal to a first rotation speed Nref1 if the speed in the transmission 60 is changed to shift-up side (step S220). The first rotation speed Nref1 is detailed later but is predetermined for example by experiment as a rotation speed lower than the resonance rotation speed band (for example, 300 rpm or 350 rpm). The determination whether the rotation speed Nm of the motor MG becomes less or equal to the first rotation speed Nref1 if the speed in the transmission 60 is changed to shift-up side is performed by determining whether there is at least one speed that brings the rotation speed of the motor MG, which is obtained from multiplying each speed ratio corresponding to each speed higher than the present speed S in the transmission 60 and the rotation speed Nd of the driveshaft 32, to a rotation speed less than or equal to the first rotation speed Nref1. The rotation speed Nm of the motor MG is computed from the rotational position of rotor in the motor MG detected by the rotational position detection sensor and input from the motor ECU 40 by communication. The rotation speed Nd of the driveshaft 32 is obtained by multiplying the vehicle speed V by a preset conversion factor kv (Nd=kv·V) or is detected by a non-illustrated rotation speed detection sensor attached to the driveshaft 32.

When the rotation speed Nm of the motor MG becomes less or equal to the first rotation speed Nref1 if the speed in the transmission 60 is changed to shift-up side, the stop time speed Sstop is set to the lowest speed (closest speed to the present speed S) in the speeds in which the rotation speed Nm of the motor MG is enabled to be less or equal to the first rotation speed Nref1 by changing the speed in the transmission 60 to shift-up side (step S230), and the stop time speed change flag Fs is set to value 1 (step S250). Upon setting the stop time speed change flag Fs to value 1, the ATECU 64 changes the speed in the transmission 60 toward shift-up side to the stop time speed S stop in the speed control routine of FIG. 2 and the speed in the transmission 60 is kept at the stop time speed S stop until the stop time speed change flag Fs is reset to value 0.

When the rotation speed Nm of the motor MG does not become less or equal to the first rotation speed Nref1 even if the speed in the transmission 60 is changed to shift-up side (for example, in the case that the rotation speed Nm of the motor MG does not become less or equal to the first rotation speed Nref1 even if the speed in the transmission 60 is changed to the fourth speed, or the case that the present speed S in the transmission 60 is the fourth speed), the CPU 72 sets the stop time speed Sstop to the fourth speed as the highest speed in the transmission 60 (step S240) and sets the stop time speed change flag Fs to value 1 (step S250). Upon setting the stop time speed change flag Fs to value 1, the ATECU 64 changes the speed in the transmission 60 toward shift-up side to the fourth speed in the speed control routine of FIG. 2, or the speed in the transmission 60 is kept at the fourth speed as the highest speed until the stop time speed change flag Fs is reset to value 0.

Subsequent to setting the stop time speed Sstop and the stop time speed change flag Fs to value 1, the CPU 72 inputs various data, for example, the accelerator opening Acc from the accelerator pedal position sensor 84, the brake pedal position BP from the brake pedal position sensor 86, the vehicle speed V from the vehicle speed sensor 88, the rotation speed Ne of the engine 22, and the rotation speed Nm of the motor MG (step S260). The rotation speed Ne of the engine 22 is computed from the signals from the crank position sensor and input from the engine ECU 24 by communication. The rotation speed Nm of the motor MG is input as described above.

Figure 6:
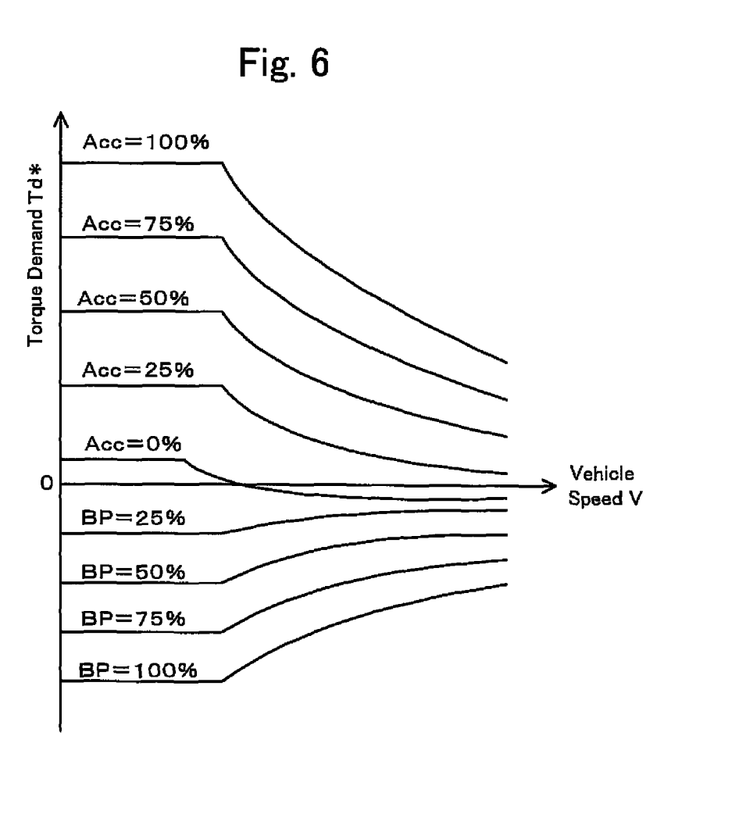
FIG. 6 shows one example of a torque demand setting map.

After the data input, the CPU 72 sets a torque demand Td* to be output to the driveshaft 32 linked with the drive wheels 36a and 36b as a torque required for driving the hybrid vehicle 20 based on the input accelerator opening Acc and the input vehicle speed V and sets a driving power demand P* required for driving the hybrid vehicle 20 (step S270). A concrete procedure of setting the torque demand Td* in this embodiment provides and stores in advance variations in torque demand Td* against the vehicle speed V with regard to various settings of the accelerator opening Acc and the brake pedal position BP as a torque demand setting map in the ROM 74 and reads the torque demand Td* corresponding to the given accelerator opening Acc, the given brake pedal position BP, and the given vehicle speed V from this torque demand setting map. One example of the torque demand setting map is shown in FIG. 6. The driving power demand P* is calculated as the product of the set torque demand Td* and the rotation speed Nd of the driveshaft 32 (for example, a value obtained by multiplying the vehicle speed V by a preset conversion factor kv).

The CPU 72 checks the stop time speed change flag Fs and a partially-engaged flag Fc representing whether the clutch 30 is partially engaged or not (step S280). The partially engaged flag Fc is a flag set to value 0 as an initial value and set to value 1 when the clutch 30 is partially engaged. Considering here the situation right after start of the execution of the engine stop time control routine, the CPU 72 determines whether the rotation speed Nm of the motor MG is less than or equal to the first rotation speed Nref1 since the stop time speed change flag Fs is set to value 1 and the partially-engaged flag Fc is set to value 0 (step S290). Further considering here the situation right after start of the execution of the engine stop time control routine, it is determined that the rotation speed Nm of the motor MG is more than the first rotation speed Nref1 and a tentative torque Tmtmp as a tentative torque of a torque to be output from the motor MG is calculated from dividing the driving power demand P* by the rotation speed Nm of the motor MG since the present situation is the case that the speed change in the transmission 60 is started to have the speed in the transmission 60 changed toward shift-up side to the stop time speed Sstop from the state that the rotation speed of the motor MG is higher than the resonance rotation speed band or the case that the speed in the transmission 60 is kept without a speed change in the state that the rotation speed Nm of the motor MG is higher than the resonance rotation speed band (step S380).

The CPU 72 next sets the nominal torque of negative value obtained from the relation of FIG. 5 based on the rotation speed Nm of the motor MG to a torque restriction Tmin as an allowable minimum torque that may be output from the motor MG (step S390), and the CPU 72 sets a torque command Tm* of the motor MG by limiting the set tentative torque Tmtmp with the set torque restriction Tmin and sends the set torque command Tm* to the motor ECU 40 (step S400). The CPU 72 sets a target brake torque Tb* by subtracting the torque command Tm* from the tentative torque Tmtmp of the motor MG and multiplying the calculated vresult of the subtraction by a preset conversion factor Ga and sends the set target brake torque Tb* to the brake ECU 94 (step S410), and returns to the processing to input data of step S260. The preset conversion factor Ga is a factor to convert the torque to be output to the driveshaft 32 to the torques to be applied to the drive wheels 36a and 36b and the driven wheels 38a and 38b. In response to reception of the setting of the torque command Tm*, the motor ECU 40 performs switching control of the inverter 42 to drive the motor MG with the torque command Tm*. In response to reception of the setting of the target brake torque Tb*, the brake ECU 94 performs drive and control of the brake actuator 92 to apply the target brake torque Tb* to the drive wheels 36a and 36b and the driven wheels 38a and 38b. In the embodiment, as described above, the speed change map of FIG. 4 is predetermined so as to output a torque within the range of the nominal torque from the motor MG in the case that the motor MG outputs the obtained torque from dividing the driving power demand P* by the rotation speed Nm of the motor MG to output the torque demand Tr* based on the accelerator opening Acc or the brake pedal position BP and the vehicle speed V to the driveshaft 32 with the disengaged clutch 30. Accordingly, when the speed in the transmission 60 is changed toward shift-up side to the stop time speed Sstop regardless of the predetermined speed change map, there may be a case that the torque demand Td* as a brake torque according to accelerator-off and brake-on is not satisfied with output torque from the motor MG and so-called torque-off state occurs. Even in this case, in the embodiment, the torque demand Td* is satisfied with the nominal torque output from the motor MG and the applied hydraulic brakes to the drive wheels 36a and 36b and driven wheels 38a and 38b from the brake actuator 92. The torque-off state is thus prevented and it is more certainly enabled to drive the hybrid vehicle 20 with the torque demand Td*.

Figure 7:
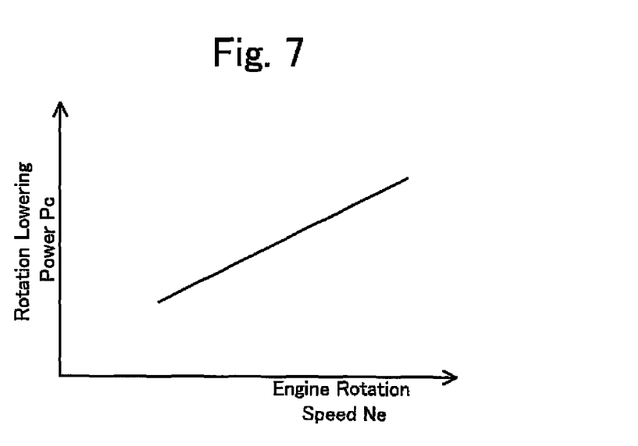
FIG. 7 shows one example of a rotation lowering power setting map.

In the case that the rotation speed Nm of the motor MG becomes less than or equal to the first rotation speed Nref1 in the processing of step S290 upon the speed change toward the shift-up side in the transmission 60 in the state that the clutch 30 is disengaged and the engine 22 is in the self-sustaining operation, or the case that the rotation speed Nm of the motor MG becomes less than or equal to the first rotation speed Nref1 in the processing of step S290 by decrease in the vehicle speed V during drive of the hybrid vehicle 20 in the state that the clutch 30 is disengaged and the engine 22 is in the self-sustaining operation, the CPU 72 sends the control signals to stop fuel injection into the engine 22 to the engine ECU 24 (step S300), and the clutch 30 is partially engaged (step S310). The CPU 72 sets the partially-engaged flag Fc to value 1 (step S320) and sets a rotation lowering power Pc required to lower the rotation speed of the engine 22 where fuel injection is stopped in the state that the clutch 30 is partially engaged based on the rotation speed Ne of the engine 22 (step S330). In response to reception of the control signals, the engine ECU 24 stops fuel injection into the engine 22 and ignition in the engine 22. The partial engagement of the clutch 60 is performed, in the embodiment, by driving the non-illustrated hydraulic actuator for the clutch 30 with a preset hydraulic pressure as a hydraulic pressure to partially engage the clutch 30. A concrete procedure of setting the rotation lowering power Pc in this embodiment provides and stores in advance variations in rotation lowering power Pc (positive value) against the rotation speed Ne of the engine 22 in the case that the non-illustrated actuator for the clutch 30 is driven with the preset hydraulic pressure as a hydraulic pressure to disengage the clutch 30 with regard to various settings of the rotation speed Ne of the engine 22 and the rotation lowering power PC as a rotation lowering power setting map in the ROM 74 and reads the rotation lowering power Pc corresponding to the given rotation speed Ne of the engine 22 from this rotation lowering power setting map. One example of the rotation lowering power setting map is shown in FIG. 7.

After setting the rotation lowering power Pc, the CPU 72 calculates the tentative torque Tmtmp of the motor MG by dividing the sum of the driving power demand P* and the rotation lowering power Pc by the rotation speed Nm of the motor MG (step S340). The CPU 72 sets the torque restriction Tmin as the nominal torque based on the rotation speed Nm of the motor MG (step S390), and the CPU 72 sets the torque command Tm* of the motor MG by limiting the set tentative torque Tmtmp with the set torque restriction Tmin and sends the set torque command Tm* to the motor ECU 40 (step S400). The CPU 72 sets the target brake torque Tb* using the torque command Tm* and the tentative torque Tmtmp and sends the set target brake torque Tb* to the brake ECU 94 (step S410), and returns to the processing to input data of step S260. This control effectively enables the rotation speed of the engine 22 to be lowered rapidly by stop of fuel injection into the engine 22 and partial engagement of the clutch 30 from the timing when the rotation speed Nm of the motor MG becomes less or equal to the first rotation speed Nref1 lower than the resonance rotation speed band after the clutch 30 is disengaged. Thus, the first rotation speed Nref1 is the rotation speed where rapid decrease of the rotation speed of the engine 22 is certainly enabled with stop of fuel injection into engine 22 and partial engagement of the clutch 30, and predetermined as a rotation speed to some extent lower than the resonance rotation speed band.

After partially engaging the clutch 30, it is determined that the stop time speed change flag Fs is value 1 and the partially-engaged flag Fc is value 1, and the CPU 72 determines whether the rotation speed Ne of the engine 22 is less than or equal to a second rotation speed Nref2 that is lower than the resonance rotation speed band (step S350). The second rotation speed Nref2 is to determine whether it is possible to disengage the partially engaged clutch 30. The second rotation speed Nref2 is the predetermined rotation speed (for example, 300 rpm, 350 rpm, or 380 rpm) lower than the resonance rotation speed band, and may be the same value as the first rotation speed Nref1 or a little higher rotation speed than the first rotation speed Nref1. When the rotation speed Ne of the engine 22 is more than the second rotation speed Nref2, the rotation lowering power Pc is set and the tentative torque Tmtmp is calculated (step S330 and S340) and the torque command Tm* is set by limiting the tentative toque Tmtemp with the torque restriction Tmin as the nominal torque to send the torque command Tm* to the motor ECU 40 (step S390 and S400). The CPU 72 sets the target brake torque Tb* and sends the target brake torque Tb* to the brake ECU 94 (step S410), and returns to the processing to input data of step S260.

When the rotation speed Ne of the engine 22 becomes less than or equal to the second rotation speed Nref2 by lowering the rotation speed Ne of the engine 22 where fuel injection is stopped with the partially engaged clutch 30, the clutch 30 is disengaged (step S360) and the stop time speed change flag Fs and the partially-engaged flag Fc are both reset to value 0 (step S370). The tentative torque Tmtmp is calculated by dividing the driving power demand P* by the rotation speed Nm of the motor MG (step S380) and the torque command Tm* is set by limiting the tentative toque Tmtemp with the torque restriction Tmin as the nominal torque to send the torque command Tm* to the motor ECU 40 (step S390 and S400). The CPU 72 sets the target brake torque Tb* and sends the target brake torque Tb* to the brake ECU 94 (step S410), and returns to the processing to input data of step S260. This control effectively enables the rotation speed of the engine 22 where fuel injection is stopped to be rapidly lowered less than or equal to the second rotation speed Nref2 lower than the resonance rotation speed band after the clutch 30 is disengaged. After setting the stop time speed change flag Fs to value 0, the speed in the transmission 60 is changed using the speed change map in the speed change control routine of FIG. 2.

After the clutch 30 is disengaged, it is determined that the stop time speed change flag Fs and the partially-engaged flsg Fc are both value 0 and the CPU 72 determines whether the rotation speed Ne of the engine 22 is more than value 0 or not (step 9420). When it is right after the clutch 30 is disengaged, the rotation speed Ne of the engine 22 is enough large and the tentative torque Tmtmp of the motor MG is calculated from dividing the driving power demand P* by the rotation speed Nm of the motor MG (step S430). The CPU 72 sets the torque command Tm* by limiting the tentative torque Tmtmp with the torque restriction Tmin and sets the target brake torque Tb* to send them respectively (step S390 through S410), and returns to the processing to input data of step 9260. When the rotation speed Ne of the engine 22 decreases and becomes value 0, the engine stop time control routine is terminated. Upon termination of the engine stop time control routine, a drive control routine for the motor drive mode (not shown) is executed.

In the hybrid vehicle 20 of the embodiment, in the case that operation stop of the engine 22 is requested while the clutch 30 is engaged and the engine 22 is driven at a higher rotation speed than the resonance rotation speed band, the clutch 30 is disengaged and the engine 22 is driven in the self-sustaining operation at the self-sustaining rotation speed higher than the resonance rotation speed band, the rotation speed Ne of the engine 22 is lowered less than or equal to the second rotation speed Nref2 lower than the resonance rotation speed band with stop of fuel injection into the engine 22 and the partially-engaged clutch 30 after the rotation speed Nm of the motor MG becomes less than or equal to the first rotation speed Nref1 predetermined as a rotation speed lower than the resonance rotation speed after the clutch 30 is disengaged. In comparison with the case that the rotation speed Ne of the engine 22 is lowered below the resonance rotation speed band with the clutch 30 disengaged and stop of the fuel injection into the engine 22, the rotation speed of the engine 22 is enabled to pass more rapidly through the resonance rotation speed band and it is effectively prevented that uncomfortable feelings are given to the driver and passenger due to noise or vibration in the vehicle. In the case that the rotation speed Nm of the motor MG becomes less than or equal to the first rotation speed Nref1 if the speed in the transmission 60 is changed towards shift-up side in the case that operation stop of the engine 22 is requested, the speed in the transmission 60 is changed toward shift-up side after disengaging the clutch 30. This enables the rotation speed Nm of the motor MG immediately lowered less than or equal to the first rotation speed Nref1, and enables the clutch 30 partially engaged to rapidly lower the rotation speed of the engine 22 without waiting for the vehicle speed V decreasing. In the case that rotation speed Nm of the motor MG does not become less than or equal to the first rotation speed Nref1 even if the speed in the transmission 60 is changed toward shift-up side in the case that operation stop of the engine 22 is requested, the speed in the transmission 60 is changed to the fourth speed or kept in the fourth speed. This effectively helps the rotation speed Nm of the motor MG to be lowered less than or equal to the first rotation speed Nref1 and helps the clutch 30 to be partially engaged early. In the case that the rotation speed Nm of the motor MG becomes less than or equal to the first rotation speed Nref1 with the speed change in the transmission 60 toward shift-up side in the case that operation stop of the engine 22 is requested, the motor MG outputs the nominal torque and the brake actuator 92 applies the hydraulic brakes to the drive wheels 36a and 36b and the driven wheels 38a and 38b when the nominal torque based on the rotation speed Nm from the motor MG does not satisfy the torque demand Td* as brake torque. This effectively prevents torque-off state caused by the speed change toward the shift-up side in the transmission 60, and enhances certain driving of the hybrid vehicle 20 with the torque demand Td* as brake torque. The motor MG outputs the torque according to the sum of the driving power demand P* and the rotation lowering power Pc even when the clutch 30 is partially engaged. This certainly enables to drive the hybrid vehicle 20 with the torque demand Td*.

In the hybrid vehicle 20 of the embodiment, upon request to stop operations of the engine 22, the speed in the transmission 60 is changed to the fourth speed or kept without change after the clutch 30 is disengaged in the case that the rotation speed Nm of the motor MG does not become lower than or equal to the first rotation speed Nref1 even if the speed in the transmission 60 is changed to shift-up side. However, even in this case, the speed in the transmission 60 may be changed according to the speed change map after the clutch 30 is disengaged.

In the hybrid vehicle 20 of the embodiment, upon request stop operations of the engine 22, the speed in the transmission 60 is changed to shift-up side after the clutch 30 is disengaged in the case that the rotation speed Nm of the motor MG becomes lower than or equal to the first rotation speed Nref1 if the speed in the transmission 60 is changed to shift-up side. However, even in this case, the speed in the transmission 60 may not be changed to shift-up side but may be changed according to the speed change map after the clutch 30 is disengaged.

In the hybrid vehicle 20 of the embodiment, the processing in the case that the driving power demand P* becomes less than the stopping threshold value upon accelerator-off and further brake-on while the engine 22 is driven at a higher rotation speed than the resonance rotation speed band in the engine drive mode. However, the speed change control and the engine stop time control may be performed in the case that the driving power demand P* becomes less than the stopping threshold value regardless of accelerator-off while the engine 22 is driven.

In the hybrid vehicle 20 of the embodiment, the clutch 30 is disengaged and the partially-engaged state is finished when the rotation speed of the engine 22 becomes less than or equal to the second rotation speed Nref2 with the clutch 30 partially-engaged. However, the clutch 30 may be disengaged to finish the partially-engaged state when the rotation speed of the engine 22 is lowered and passes through the resonance rotation speed band.

In the hybrid vehicle 20 of the embodiment, using the speed change map, the target speed S* in the transmission 60 is set based on the vehicle speed V and the accelerator opening Acc. However, the target speed S* may be set based on the vehicle speed V and the throttle opening of the engine 22, may be set based on the vehicle speed V and the intake air amount of the engine 22, or may be set based only on the vehicle speed V.

In the hybrid vehicle 20 of the embodiment, the transmission 60 is structured to change its speed between four different speeds. However, the transmission may be structured to change its speed between two speeds, three speeds, or more than five speeds. The driveshaft 32 may be directly connected to the power shaft 28 without having the transmission in the hybrid vehicle.

The embodiment regards the hybrid vehicle. The principle of the present invention is, however, not restricted to the hybrid vehicle but is also actualized by another vehicle, such as a train, other than a motor vehicle and may be actualized by a control method of the hybrid vehicle 20.

The primary elements in the embodiment and its modified examples are mapped to the primary constituents in the claims of the invention as described below. The engine 22 corresponds to the 'internal combustion engine' in the claims of the invention. The motor MG corresponds to the 'motor' in the claims of the invention. The battery 50 corresponds to the 'accumulator' in the claims of the invention. The hybrid electronic control unit 70 executing the processing of step S200 through S410 in the engine stop time control routine of FIG. 3, the engine ECU 24 performing control of the engine 22 according to the control signals, the motor ECU 40 performing control of the motor MG according to the torque command Tm*, and the brake ECU 94 performing drive and control of the brake actuator 92 according to the requirements correspond to the 'controller' in the claims of the invention. In the case that operation stop of the engine 22 is requested while the engine 22 is driven at a higher rotation speed than the resonance rotation speed band with the clutch 30 engaged, the hybrid electronic control unit 70 here sends the control signals to drive the engine 22 in the self-sustaining operation at the self-sustaining rotation speed higher than the resonance rotation speed band with the clutch 30 disengaged to the engine ECU 24 and sets the torque command Tm* and the target brake torque Tb* to drive the hybrid vehicle 20 with the torque demand Td* to send the settings to the motor ECU 40 and the brake ECU 94. In the case that the rotation speed Nm of the motor MG becomes less than or equal to the first rotation speed Nref1 predetermined as a rotation speed less than the resonance rotation speed band after the clutch 30 is disengaged, the hybrid electronic control unit 70 sends the control signals to stop fuel injection into the engine 22 to the engine ECU 24 to lower the rotation speed Ne of the engine 22 less than or equal to the second rotation speed Nref2 lower than the resonance rotation speed band with the clutch 30 partially engaged and sets the torque command Tm* and the target brake torque Tb* to drive the hybrid vehicle 20 with the torque demand Td* to send the settings to the motor ECU 40 and the brake ECU 94. The transmission 60 having the input shaft connected to the power shaft 28 and the output shaft connected to the driveshaft 32 corresponds to the 'transmission' in the claims of the invention. The combination of the brake master cylinder 90, the brake wheel cylinders 96*a* to 96*d*, and the brake actuator 92 which regulates the hydraulic pressures of brake wheel cylinders 96*a* to 96*d* to enable application of a brake torque to the drive wheels 36*a* and 36*b* and to driven wheels 38*a* and 38*b* corresponds to the 'braking force application unit' in the claims of the invention.

The 'internal combustion engine' is not restricted to the internal combustion engine designed to consume a hydrocarbon fuel, such as gasoline or light oil, and thereby output power, but may be any other type of engine configured to output power via a clutch to a driveshaft linked to driving wheels, for example, a hydrogen engine. The 'motor' is not restricted to the motor MG constructed as a synchronous motor generator but may be any other type of motor configured to input and output power from and to the driveshaft, for example, an induction motor. The 'accumulator' is not restricted to the battery 50 constructed as a secondary battery but may be any other type configured to transmit electric power to and from the motor, for example, a capacitor. The 'controller' is not restricted to the combination of electronic control units, such as the hybrid electronic control unit 70, the engine ECU 24, and the motor ECU 40, but may consist of a single electronic control unit. The 'controller' is not restricted to the arrangement of, in the case that operation stop of the engine 22 is requested while the engine 22 is driven at a higher rotation speed than the resonance rotation speed band with the clutch 30 engaged, driving the engine 22 in the self-sustaining operation at the self-sustaining rotation speed higher than the resonance rotation speed band with the clutch 30 disengaged and controlling the motor MG and the brake actuator 92 with the torque command Tm* and the target brake torque Tb* to drive the hybrid vehicle 20 with the torque demand Td*, while controlling the engine 22 to stop fuel injection into the engine 22 to lower the rotation speed Ne of the engine 22 less than or equal to the second rotation speed Nref2 lower than the resonance rotation speed band with the clutch 30 partially engaged and controlling the motor MG and the brake actuator 92 to drive the hybrid vehicle 20 with the torque demand Td* in the case that the rotation speed Nm of the motor MG becomes less than or equal to the first rotation speed Nref1 predetermined as a rotation speed less than the resonance rotation speed band after the clutch 30 is disengaged. The 'controller' may be any arrangement configured to, in a case of a predetermined stop request time that is when operation stop of the internal combustion engine is requested while the internal combustion engine is in operation with the clutch engaged at a higher rotation speed than a resonance rotation speed band that is a rotation speed range of the internal combustion engine where resonance occurs in the vehicle, control the internal combustion engine, the motor, and the clutch so that the clutch is disengaged and the vehicle is driven with a driving force demand required for driving the vehicle while keeping a rotation speed higher than the resonance rotation speed band in the internal combustion engine, and subsequently control the internal combustion engine, the motor, and the clutch so that the rotation speed of the internal combustion engine is lowered below the rotation speed band by partially engaging the clutch and stopping fuel injection into the internal combustion engine and the vehicle is driven with the driving force demand after a rotation speed of the motor reaches less than or equal to a predetermined rotation speed as a rotation speed lower than the resonance rotation speed band. The 'transmission' is not restricted to the transmission 60 having the input shaft connected to the power shaft 28 and the output shaft connected to the driveshaft 32 with a speed change between four different speeds but may be any other transmission that has an input shaft connected via the clutch to an output shaft of the internal combustion engine and connected with a rotating shaft of the motor and transmits power between the input shaft and the driveshaft with a speed change between different speeds, for example, a transmission with a speed change between two different speeds, three different speeds, or more than five different speeds. The 'braking force applying unit' is not restricted to the combination of the brake master cylinder 90, the brake wheel cylinders 96*a* to 96*d*, and the brake actuator 92 which regulates the hydraulic pressures of brake wheel cylinders 96*a* to 96*d* to enable application of a brake torque to the drive wheels 36*a* and 36*b* and to driven wheels 38*a* and 38*b* but may be any other unit configured to apply braking force to the vehicle.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the vehicles.

The invention claimed is:

1. A vehicle, comprising:
an internal combustion engine configured to output power via a clutch to a driveshaft linked to driving wheels;
a motor configured to input and output power from and to the driveshaft;
a transmission that has an input shaft connected via the clutch to an output shaft of the internal combustion engine and connected with a rotating shaft of the motor and transmits power between the input shaft and the driveshaft with a speed change between different speeds;
an accumulator configured to transmit electric power to and from the motor; and
a controller configured to, in a case of a predetermined stop request time that is when operation stop of the internal combustion engine is requested while the internal combustion engine is in operation with the clutch engaged at a higher rotation speed than a resonance rotation speed band that is a rotation speed range of the internal combustion engine where resonance occurs in the vehicle, control the internal combustion engine, the motor, and the clutch so that the clutch is disengaged and the vehicle is driven with a driving force demand required for driving the vehicle while keeping a rotation speed higher than the resonance rotation speed band in the internal combustion engine, and subsequently control the internal combustion engine, the motor, and the clutch so that the rotation speed of the internal combustion engine is lowered below the rotation speed band by partially engaging the clutch and stopping fuel injection into the internal combustion engine and the vehicle is driven with the driving force demand after a rotation speed of the motor reaches less than or equal to a predetermined rotation speed as a rotation speed lower than the resonance rotation speed band,
wherein the controller controls the transmission, in a case that the rotation speed of the motor becomes less than or equal to the predetermined rotation speed if the speed in the transmission is changed to a higher speed level that is a higher speed than a present speed in the transmission in the case of the predetermined stop request time, so that the speed in the transmission is changed to the higher speed level after the clutch is disengaged.

2. The vehicle in accordance with claim 1, wherein the controller controls the transmission, in a case that the rotation speed of the motor does not become less than or equal to the predetermined rotation speed even if the speed in the transmission is changed in the case of the predetermined stop request time, so that the speed in the transmission is changed to a highest speed level of the transmission after the clutch is disengaged.

3. The vehicle in accordance with claim 1, the vehicle further having:
a braking force applying unit configured to apply braking force to the vehicle,
wherein the controller controls the motor and the braking force applying unit, in a case that the driving force demand as a braking force is not satisfied with a nominal torque output from the motor according to the rotation speed of the motor if the speed in the transmission is changed to the higher speed level on condition that the rotation speed of the motor becomes less than or equal to the predetermined rotation speed if the speed in the transmission is changed to the higher speed level in the case of the predetermined stop request time, so that the vehicle is driven with the driving force demand satisfied with the nominal torque output from the motor and the braking force applied from the braking force applying unit to the vehicle.

4. The vehicle in accordance with claim 1, wherein the controller performs control regarding when operation stop of the internal combustion engine is requested upon accelerator-off as the predetermined stop request time.

5. The vehicle in accordance with claim 1, wherein the controller controls the clutch so that the partially engaged clutch is disengaged in a case that the rotation speed of the internal combustion engine becomes less than or equal to a second predetermined rotation speed as a rotation speed lower than the resonance rotation speed band.

* * * * *